(12) United States Patent
Harrison et al.

(10) Patent No.: US 7,559,507 B2
(45) Date of Patent: Jul. 14, 2009

(54) THRUST REVERSERS INCLUDING LOCKING ASSEMBLIES FOR INHIBITING DEFLECTION

(75) Inventors: Geoffrey E. Harrison, Seattle, WA (US); Joe E. Sternberger, Seattle, WA (US); Michael K. Lallement, Seattle, WA (US); John T. Strunk, Seattle, WA (US); William S. Byrd, Seattle, WA (US); Darrell C. Jundt, Seattle, WA (US)

(73) Assignee: The Boeing Company, Chicago, IL (US)

( * ) Notice: Subject to any disclaimer, the term of this patent is extended or adjusted under 35 U.S.C. 154(b) by 533 days.

(21) Appl. No.: 11/168,257

(22) Filed: Jun. 27, 2005

(65) Prior Publication Data

US 2007/0007388 A1 Jan. 11, 2007

(51) Int. Cl.
*F02K 1/70* (2006.01)
(52) U.S. Cl. .................. 244/110 B; 60/226.2; 60/228
(58) Field of Classification Search ............. 244/110 B; 60/228, 230, 226.2; 239/265.31
See application file for complete search history.

(56) References Cited

U.S. PATENT DOCUMENTS

| | | | |
|---|---|---|---|
| 3,500,644 A | 3/1970 | Hom et al. | |
| 3,600,023 A | 8/1971 | Gudde | |
| 3,762,667 A | 10/1973 | Pender | |
| 3,824,785 A | 7/1974 | Soligny et al. | |
| 4,044,973 A | 8/1977 | Moorehead | |
| 4,283,028 A | 8/1981 | Wilke | |
| 4,286,727 A | 9/1981 | Limoncelli | |
| 4,365,775 A | 12/1982 | Glancy | |
| 4,549,708 A | 10/1985 | Norris | |
| 4,557,441 A | 12/1985 | Aspinall | |
| 4,585,189 A | 4/1986 | Buxton | |
| 4,629,146 A | 12/1986 | Lymons | |
| 4,679,750 A | 7/1987 | Burhans | |
| 4,683,717 A | 8/1987 | Naud et al. | |

(Continued)

FOREIGN PATENT DOCUMENTS

EP 0 926 333 A1 6/1999

(Continued)

OTHER PUBLICATIONS

U.S. Appl. No. 11/773,488, filed Jul. 5, 2007, Welch et al.

*Primary Examiner*—Timothy D Collins
*Assistant Examiner*—Benjamin P Lee
(74) *Attorney, Agent, or Firm*—Perkins Coie LLP

(57) ABSTRACT

Aircraft systems having thrust reversers with locking assemblies are disclosed herein. In one embodiment, an aircraft system includes a fan casing and a thrust reverser attached to the fan casing. The fan casing includes a first member. The thrust reverser includes a nozzle inner wall, a second member proximate to the nozzle inner wall for engaging with the first member, and a locking member positioned proximate to the first member. The locking member is movable between (a) a first position in which the first member is positioned between the locking member and the second member such that the locking member inhibits disengagement of the first and second members, and (b) a second position in which the locking member does not inhibit disengagement of the first and second members. The first member can be a V-groove, and the second member can be a V-blade.

18 Claims, 7 Drawing Sheets

U.S. PATENT DOCUMENTS

| | | | |
|---|---|---|---|
| 4,731,991 A | | 3/1988 | Newton et al. |
| 4,894,985 A | | 1/1990 | Dubois et al. |
| 5,003,770 A | * | 4/1991 | Schegerin et al. .......... 60/226.2 |
| 5,076,514 A | | 12/1991 | Melcher |
| 5,083,426 A | | 1/1992 | Layland |
| 5,090,197 A | | 2/1992 | Dubois et al. |
| 5,112,242 A | | 5/1992 | Choy et al. |
| 5,239,822 A | | 8/1993 | Buchacher |
| 5,306,118 A | | 4/1994 | Holmes et al. |
| 5,307,623 A | | 5/1994 | Antuna et al. |
| 5,313,788 A | | 5/1994 | Wright et al. |
| 5,369,954 A | | 12/1994 | Stuart |
| 5,381,986 A | | 1/1995 | Smith et al. |
| 5,524,431 A | * | 6/1996 | Brusson et al. ............ 60/226.2 |
| 5,655,360 A | | 8/1997 | Butler |
| 5,706,651 A | | 1/1998 | Lillibridge et al. |
| 5,788,659 A | | 8/1998 | Haas |
| 5,791,138 A | | 8/1998 | Lillibridge et al. |
| 5,794,434 A | * | 8/1998 | Szupkay .................. 60/226.2 |
| 5,819,528 A | | 10/1998 | Masson et al. |
| 5,863,014 A | | 1/1999 | Standish et al. |
| 5,904,041 A | | 5/1999 | Dhainault et al. |
| 5,915,765 A | | 6/1999 | Sternberger |
| 5,943,856 A | | 8/1999 | Lillibridge et al. |
| 5,983,625 A | * | 11/1999 | Gonidec et al. ............ 60/226.2 |
| 5,987,880 A | * | 11/1999 | Culbertson ................ 60/204 |
| 6,021,636 A | * | 2/2000 | Johnson et al. ............ 60/226.2 |
| 6,032,901 A | | 3/2000 | Carimali et al. |
| 6,036,238 A | | 3/2000 | Lallament |
| 6,059,231 A | | 5/2000 | Dessenberger, Jr. |
| 6,065,285 A | | 5/2000 | Gonidec et al. |
| 6,145,786 A | * | 11/2000 | Baudu et al. ............. 244/110 B |
| 6,148,607 A | * | 11/2000 | Baudu et al. ................ 60/226.2 |
| 6,151,886 A | | 11/2000 | Vauchel et al. |
| 6,170,254 B1 | | 1/2001 | Cariola |
| 6,173,807 B1 | | 1/2001 | Welch et al. |
| 6,189,832 B1 | | 2/2001 | Jackson |
| 6,220,546 B1 | | 4/2001 | Klamka et al. |
| 6,227,485 B1 | | 5/2001 | Porte et al. |
| 6,237,325 B1 | | 5/2001 | Hogie et al. |
| 6,293,495 B1 | * | 9/2001 | Aten et al. ............... 244/110 B |
| 6,340,135 B1 | | 1/2002 | Barton |
| 6,517,027 B1 | | 2/2003 | Abruzzese |
| 6,546,715 B1 | | 4/2003 | Blevins et al. |
| 6,568,172 B2 | | 5/2003 | Jannetta et al. |
| 6,764,045 B2 | * | 7/2004 | Sternberger ............. 244/110 B |
| 6,895,742 B2 | | 5/2005 | Lair et al. |
| 6,945,031 B2 | | 9/2005 | Lair |
| 7,124,981 B2 | * | 10/2006 | Parham .................. 244/110 B |
| 2003/0066284 A1 | * | 4/2003 | Chakkera et al. ............ 60/226.2 |
| 2004/0068978 A1 | | 4/2004 | Lair et al. |
| 2004/0159741 A1 | | 8/2004 | Sternberger et al. |
| 2004/0206066 A1 | * | 10/2004 | Eschborn ..................... 60/223 |
| 2006/0059886 A1 | | 3/2006 | Strunk et al. |
| 2006/0277895 A1 | | 12/2006 | Thornock et al. |
| 2007/0084964 A1 | | 4/2007 | Sternberger |
| 2008/0098720 A1 | * | 5/2008 | Watson ...................... 60/226.2 |

FOREIGN PATENT DOCUMENTS

FR            2711187          4/1995

* cited by examiner

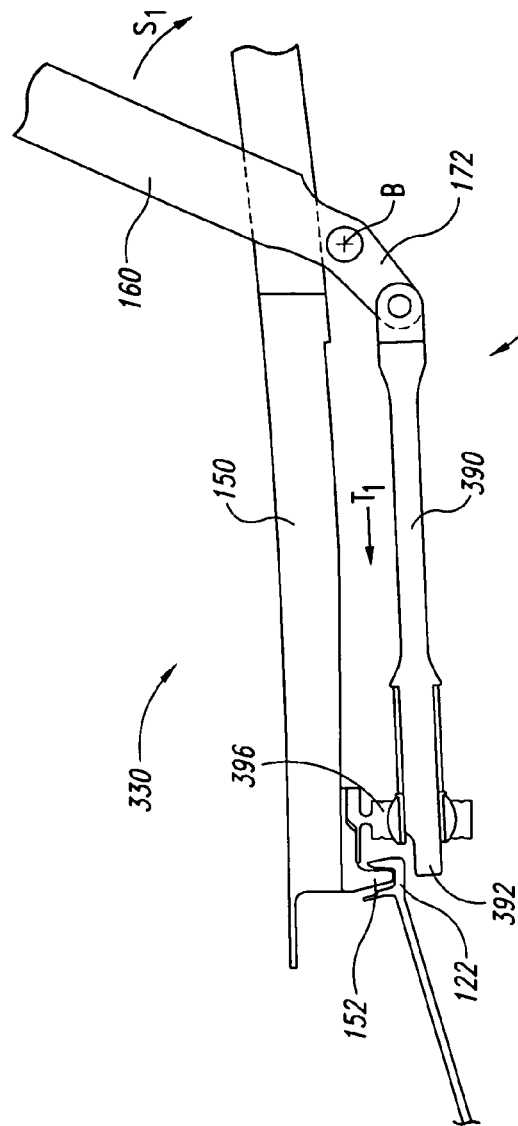
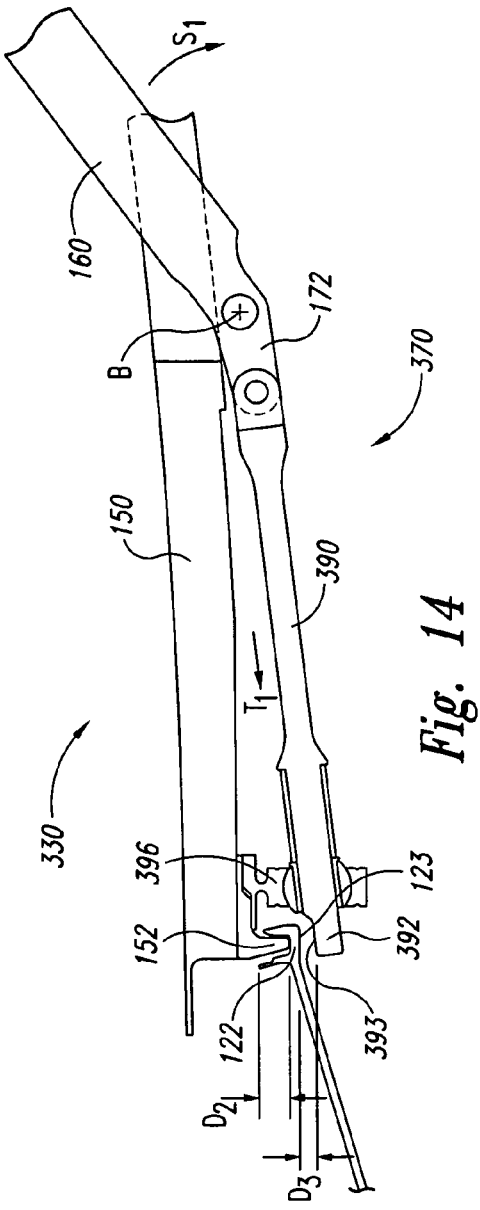

THRUST REVERSERS INCLUDING LOCKING ASSEMBLIES FOR INHIBITING DEFLECTION

TECHNICAL FIELD

The present invention is related to thrust reversers having locking assemblies for inhibiting deflection of the nozzle inner wall and/or disengagement of the inner V-blade and the inner V-groove.

BACKGROUND

Jet aircraft include nacelles for housing the engines and coupling the engines to the wings. The nacelles are contoured to reduce aerodynamic drag during operation of the aircraft. Conventional nacelles include a pair of thrust reverser cowlings that form a clam-shaped structure which wraps around the aircraft engine. During aircraft operation, the thrust reverser cowlings must be capable of withstanding considerable hoop loads caused by the high pressure of the jet exhaust stream flowing therein.

Conventional thrust reverser cowlings are pivotably coupled to a pylon at the upper portion of the nacelle. The thrust reverser cowlings can accordingly be pivoted upward to access the engine for maintenance and/or repair. During aircraft operation, the thrust reverser cowlings are closed and their distal ends are positioned proximate to each other at the lower portion of the nacelle. The distal ends of the thrust reverser cowlings can include a latching mechanism for locking the cowlings together during engine operation.

One drawback of conventional thrust reverser cowlings is that the inner walls may not be sufficiently stiff to prevent significant deflection when used with high-thrust engines. For example, during a rejected take-off, a high-thrust engine places an increased load on the blocker doors of the thrust reverser, which may cause the inner walls to deflect. Significant deflection in the inner walls of the thrust reverser changes the load path between the engine and the thrust reverser, which can damage components in the engine and thrust reverser. Due to space constraints in certain applications, it may not be possible to increase the thickness of the inner walls to preclude significant deflection. Accordingly, there is a need to inhibit deflection of the inner walls of the thrust reverser.

SUMMARY

Several aspects of the invention are directed to aircraft systems having thrust reversers with locking assemblies. An aircraft system in accordance with one embodiment includes a fan casing and a thrust reverser attached to the fan casing. The fan casing includes a first member. The thrust reverser includes a nozzle inner wall, a second member proximate to the nozzle inner wall for engaging with the first member, and a locking member positioned proximate to the first member. The locking member is movable between (a) a first position in which the first member is positioned between the locking member and the second member such that the locking member inhibits the first and second members from disengaging, and (b) a second position in which the locking member does not inhibit the first and second members from disengaging. The first member can be a V-groove, and the second member can be a V-blade. The thrust reverser can further include (a) a blocker door movable between a deployed position and a stowed position, and (b) a drag link operably coupling the locking member and the blocker door.

In another embodiment, an aircraft system includes a thrust reverser having a nozzle inner wall, an inner V-blade projecting from the nozzle inner wall, a blocker door movable between a deployed position and a stowed position, and a locking member movable between a first position and a second position. The locking member is operably coupled to the blocker door such that the locking member moves to the first position and inhibits deflection of the nozzle inner wall when the blocker door moves to the deployed position. The locking member also moves to the second position and does not inhibit deflection of the nozzle inner wall when the blocker door moves to the stowed position.

In yet another embodiment, an aircraft system includes a fan casing and a thrust reverser attached to the fan casing. The fan casing includes a first member. The thrust reverser includes a nozzle inner wall, a second member proximate to the nozzle inner wall for coupling with the first member, a blocker door movable between a deployed position and a stowed position, and means for automatically inhibiting the first and second members from decoupling when the blocker door is in the deployed position.

BRIEF DESCRIPTION OF THE DRAWINGS

FIG. 13 is a schematic view of the locking assembly of FIG. 12 with the thrust reverser partially deployed.

FIG. 14 is a schematic view of the locking assembly of FIG. 12 with the thrust reverser completely deployed.

DETAILED DESCRIPTION

The following disclosure describes aircraft systems having thrust reversers with locking assemblies for inhibiting deflection of the nozzle inner wall. Certain details are set forth in the following description and in FIGS. 1-14 to provide a thorough understanding of various embodiments of the invention. Other details describing well-known structures and systems often associated with thrust reversers are not set forth in the following disclosure to avoid unnecessarily obscuring the description of various embodiments of the invention.

Many of the details, dimensions, angles, and other features shown in the figures are merely illustrative of particular embodiments of the invention. Accordingly, other embodiments can have other details, dimensions, and/or features without departing from the present invention. In addition, further embodiments of the invention may be practiced without several of the details described below, or various aspects of any of the embodiments described below can be combined in different combinations.

Figure 1:
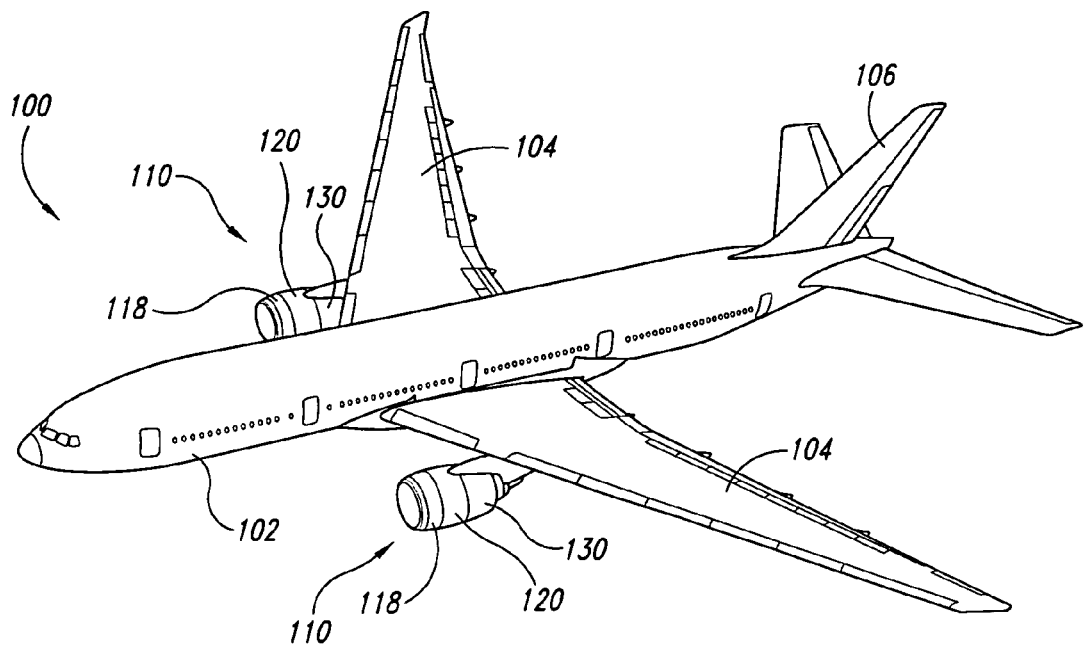
FIG. 1 is a schematic isometric view of an aircraft having a plurality of power plants in accordance with one embodiment of the invention.

A. Embodiments of Aircraft Systems Having Thrust Reversers With Locking Assemblies FIG. 1 is a schematic isometric view of an aircraft 100 having a plurality of power plants 110 in accordance with one embodiment of the invention. The aircraft 100 further includes a fuselage 102, a plurality of wings 104 attached to the fuselage 102, and a tail 106 attached to the fuselage 102. Although the illustrated power plants 110 are mounted to corresponding wings 104, in other embodiments, the power plants 110 can be coupled to the fuselage 102 and/or the tail 106. The individual power plants 110 include an inlet housing 118, a fan casing 120 coupled to the inlet housing 118, and a thrust reverser 130 coupled to the fan casing 120.

Figure 2:
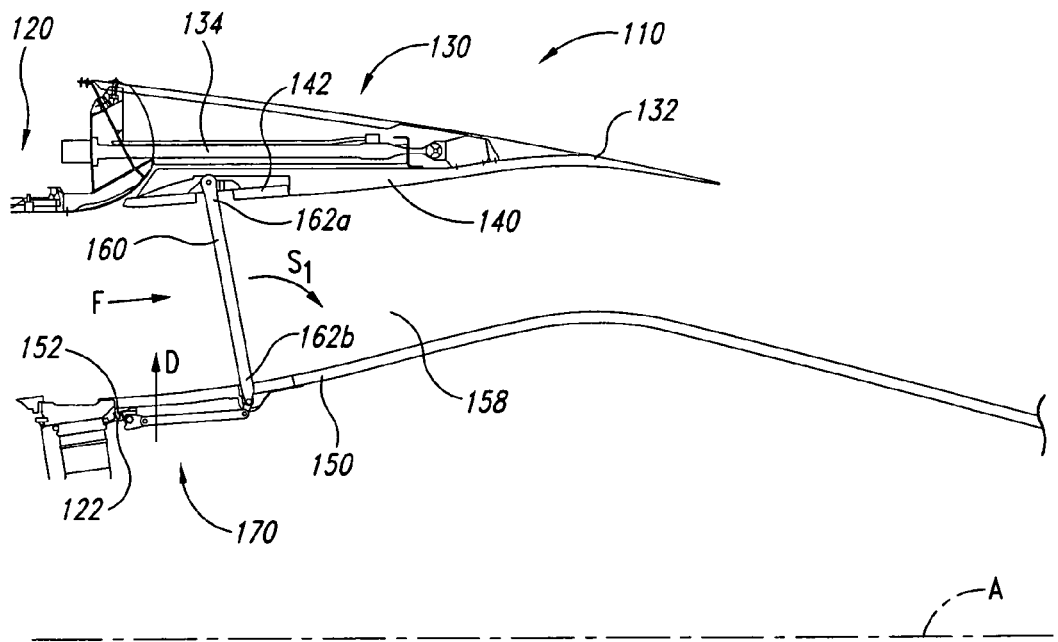
FIG. 2 is a schematic view of a portion of one of the power plants illustrated in FIG. 1.

FIG. 2 is a schematic view of a portion of one of the power plants 110 illustrated in FIG. 1. The illustrated thrust reverser 130 includes a nozzle outer wall 140, a nozzle inner wall 150 radially inward of the nozzle outer wall 140, an inner V-blade 152 (described further with reference to FIG. 4) projecting radially inward from a forward section of the nozzle inner wall 150, and a locking assembly 170 coupled to the forward section of the nozzle inner wall 150. The nozzle outer wall 140 and the nozzle inner wall 150 define a nozzle 158 through which fan gas flows in a direction F to produce forward thrust for the power plant 110. The nozzle 158 is positioned radially outward from an axis of symmetry A of the power plant 110. The inner V-blade 152 is received in an inner V-groove 122 (also described further with reference to FIG. 4) of the fan casing 120. The inner V-groove 122 and the inner V-blade 152 couple the fan casing 120 and the thrust reverser 130 together and transfer loads between the fan casing 120 and the thrust reverser 130. The locking assembly 170 selectively prevents disengagement of the inner V-groove 122 and the inner V-blade 152 and inhibits deflection of the nozzle inner wall 150 in a direction D, as described below in detail.

The illustrated thrust reverser 130 further includes a translating cowling 132, an actuator 134 for moving the translating cowling 132, a blocker door 142 carried by the nozzle outer wall 140, and a drag link 160 extending between the blocker door 142 and the nozzle inner wall 150. The translating cowling 132 and the nozzle outer wall 140 are movable as a unit between a stowed position (shown in FIG. 2) and a deployed position (described below with reference to FIG. 3). When the translating cowling 132 and the nozzle outer wall 140 are in the stowed position, the nozzle outer wall 140 directs gas aftward and produces forward thrust. The blocker door 142 is also movable between a stowed position (shown in FIG. 2) and a deployed position (also described below with reference to FIG. 3).

The drag link 160 includes a first end portion 162a attached to the blocker door 142 and a second end portion 162b coupled to the locking assembly 170 at the nozzle inner wall 150. When the translating cowling 132 and the nozzle outer wall 140 move from the stowed position to the deployed position, the drag link 160 pivots in a direction $S_1$ about an axis B and pulls the blocker door 142 downward to the deployed position. The drag link 160 also actuates the locking assembly 170 so that the assembly 170 inhibits the inner V-groove 122 and the inner V-blade 152 from decoupling and the nozzle inner wall 150 from deflecting.

Figure 3:
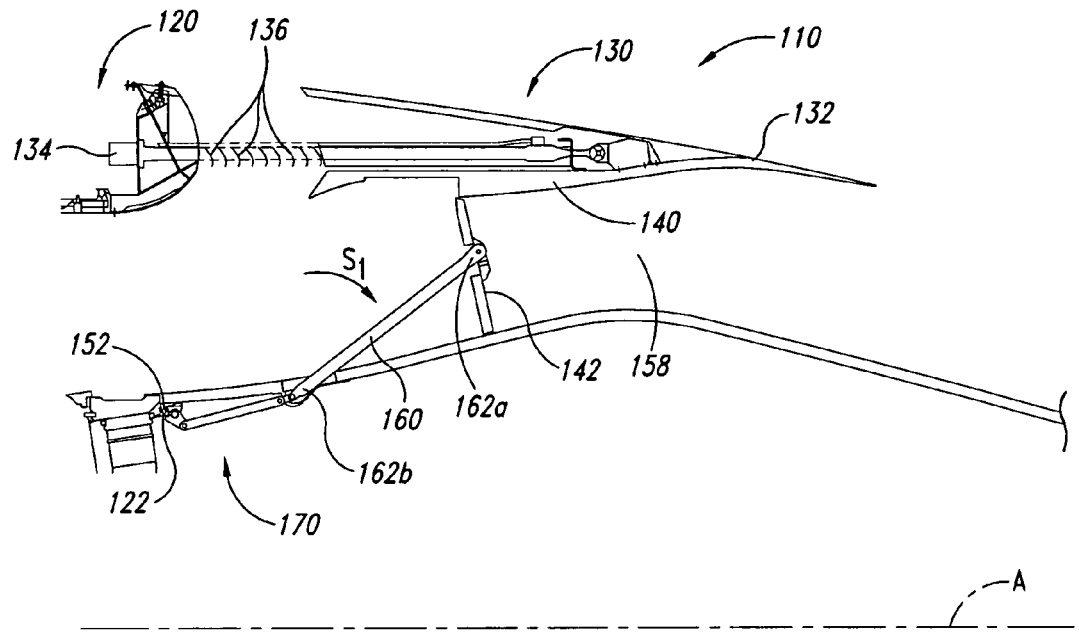
FIG. 3 is a schematic view of the power plant illustrated in FIG. 2 with the thrust reverser deployed.

FIG. 3 is a schematic view of the power plant 110 illustrated in FIG. 2 with the thrust reverser 130 deployed. When the translating cowling 132 and the nozzle outer wall 140 are in the deployed position, a plurality of guide vanes 136 are exposed to gas flow in the nozzle 158, and the blocker door 142 obstructs gas flow through the nozzle 158 so that at least a portion of the flow is diverted radially outward to the guide vanes 136. The guide vanes 136 change the direction of the gas flow to generate reverse thrust to assist in decelerating the aircraft 100 (FIG. 1).

Figure 4:
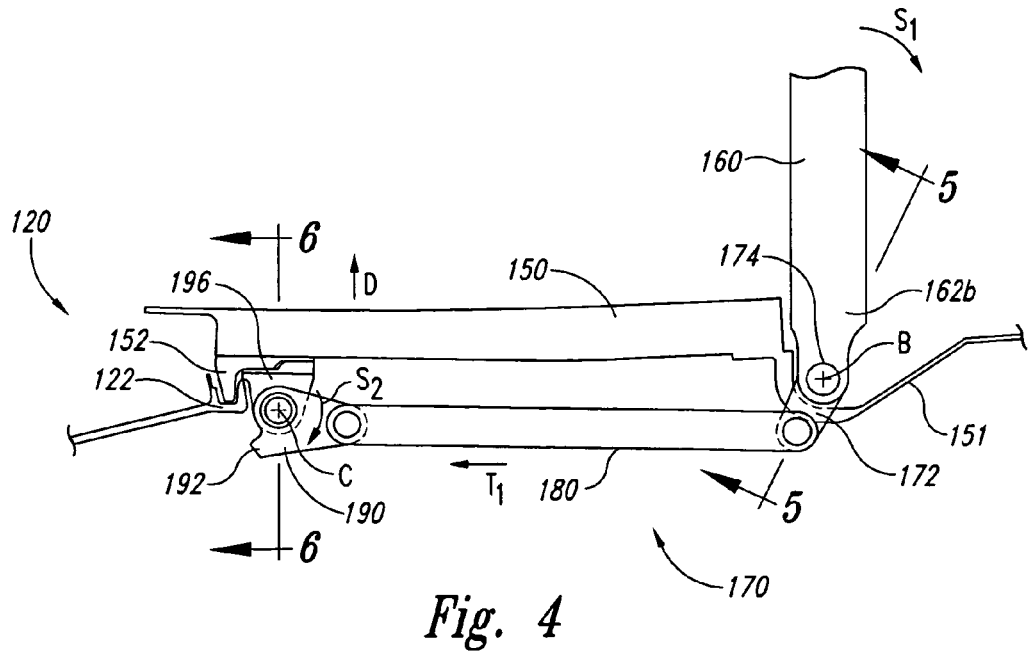
FIG. 4 is a schematic view of a locking assembly of the power plant in accordance with one embodiment of the invention.

FIG. 4 is a schematic view of the locking assembly 170 in accordance with one embodiment of the invention. The locking assembly 170 is movable between (a) a release position (shown in FIG. 4) in which the assembly 170 does not inhibit disengagement of the V-groove 122 and the V-blade 152, and (b) a lock position (described further with reference to FIG. 8) in which the assembly 170 inhibits disengagement of the V-groove 122 and the V-blade 152. The locking assembly 170 is coupled to the drag link 160 such that the locking assembly 170 moves to the lock position when the blocker door 142 (FIG. 3) moves to the deployed position, and the locking assembly 170 moves to the release position when the blocker door 142 moves to the stowed position.

The illustrated locking assembly 170 includes a crank 172 coupled to the drag link 160, a link 180 pivotably attached to the crank 172, a locking member 190 pivotably attached to the link 180, and a support member 196 pivotably attached to the locking member 190. The crank 172 pivots with the drag link 160 about the axis B as the drag link 160 moves with the blocker door 142 (FIGS. 2 and 3) between the stowed and deployed positions as described below in FIG. 5.

Figure 5:
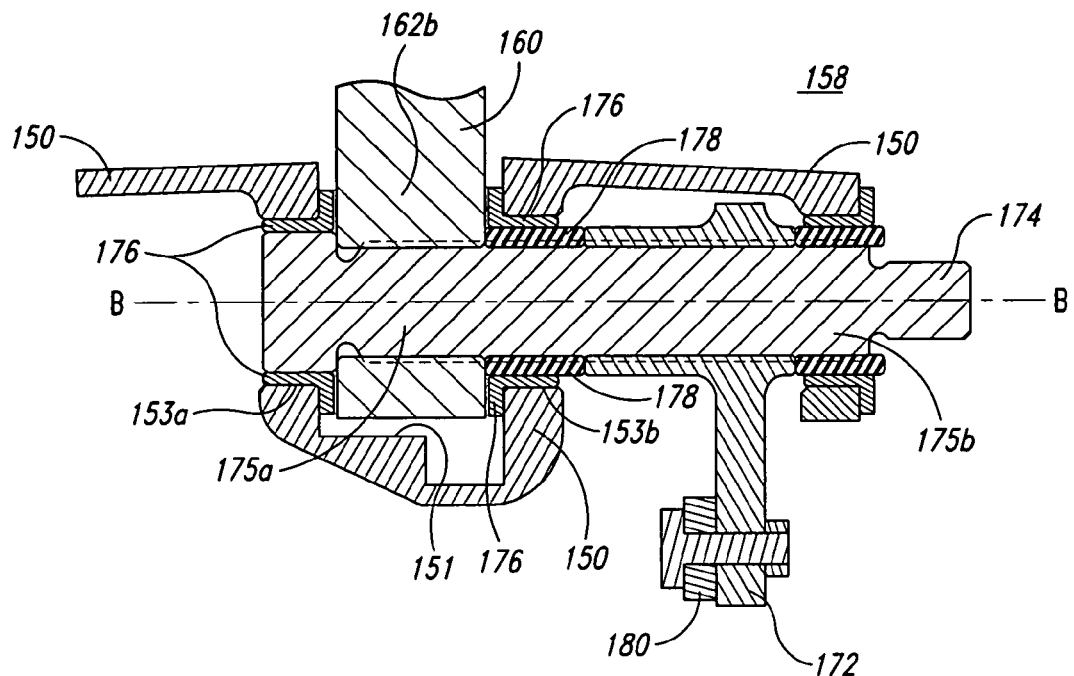
FIG. 5 is a schematic view of the locking assembly taken substantially along line 5-5 of FIG. 4.

FIG. 5 is a schematic view of the locking assembly 170 taken substantially along line 5-5 of FIG. 4 and illustrates one embodiment of the connection between the drag link 160 and the crank 172. In the illustrated embodiment, the drag link 160 is attached to a first end portion 175a of a shaft 174, and the crank 172 is attached to a second end portion 175b of the shaft 174. The shaft 174 can be a spline coupling shaft that transfers rotation from the drag link 160 to the crank 172. In the illustrated embodiment, the nozzle inner wall 150 includes a recess 151 to receive the second end portion 162b of the drag link 160 and the first end portion 175a of the shaft 174. The recess 151 includes two apertures (identified individually as 153a-b) through which the shaft 174 extends. A plurality of bearings 176 are positioned between the inner wall 150 and the shaft 174 to permit the shaft 174 to rotate about the axis B-B, and a plurality of seals 178 are attached between the inner wall 150 and the shaft 174 to inhibit high pressure gas from escaping from the nozzle 158.

Figure 6:
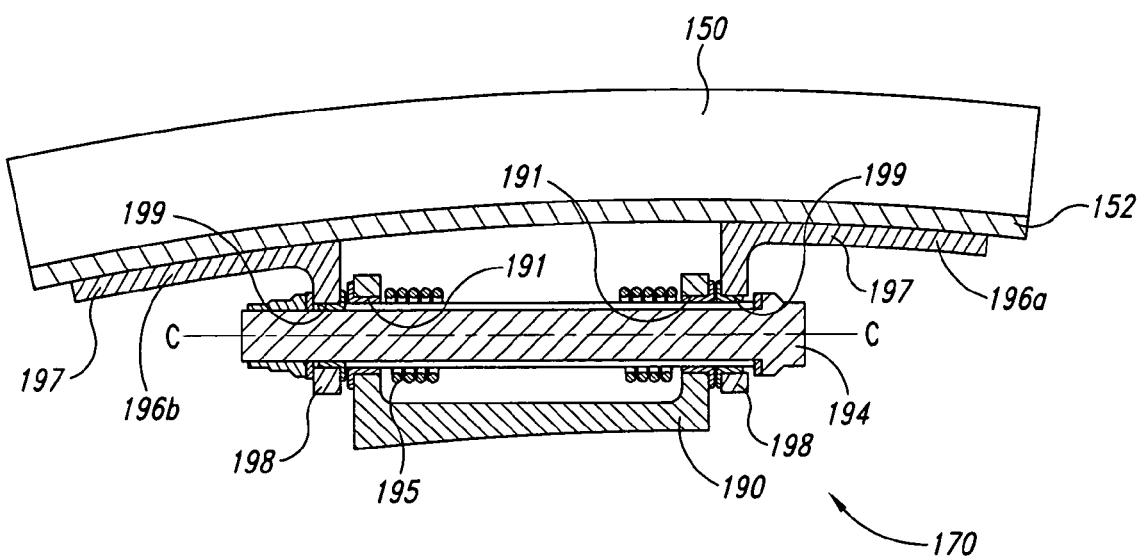
FIG. 6 is a schematic view of the locking assembly taken substantially along line 6-6 of FIG. 4.

FIG. 6 is a schematic view of the locking assembly 170 taken substantially along line 6-6 of FIG. 4. The illustrated support member 196 includes two support brackets 196a-b each having a base 197 attached to the inner V-blade 152, an arm 198 projecting from the base 197, and an aperture 199 extending through the arm 198. The bases 197 have an arcuate configuration that corresponds to the contour of the inner V-blade 152 and the nozzle inner wall 150. The locking member 190 has two apertures 191 aligned with the apertures 199 in the support brackets 196a-b and sized to receive a fastener 194. The fastener 194 couples the support brackets 196a-b and the locking member 190 together so that the locking member 190 can pivot about an axis C. The illustrated locking assembly 170 also includes a preloaded spring 195 for urging the locking member 190 toward the release position illustrated in FIG. 4 to avoid excessive wear of the locking assembly components in a high vibration environment. In other embodiments, such as those described below with reference to FIGS. 12-14, the support member 196 and/or locking member 190 can have other configurations.

Figure 7:
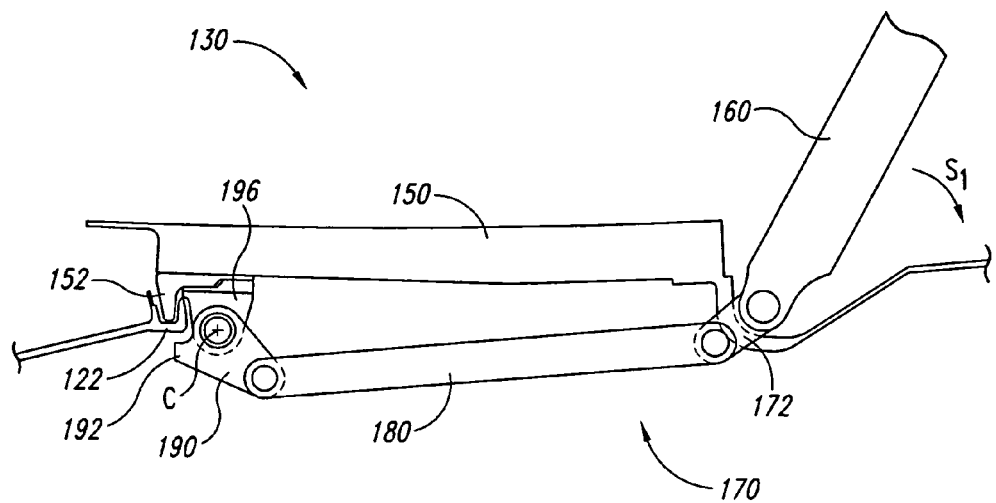
FIG. 7 is a schematic view of the locking assembly when the thrust reverser is partially deployed.
Figure 8:
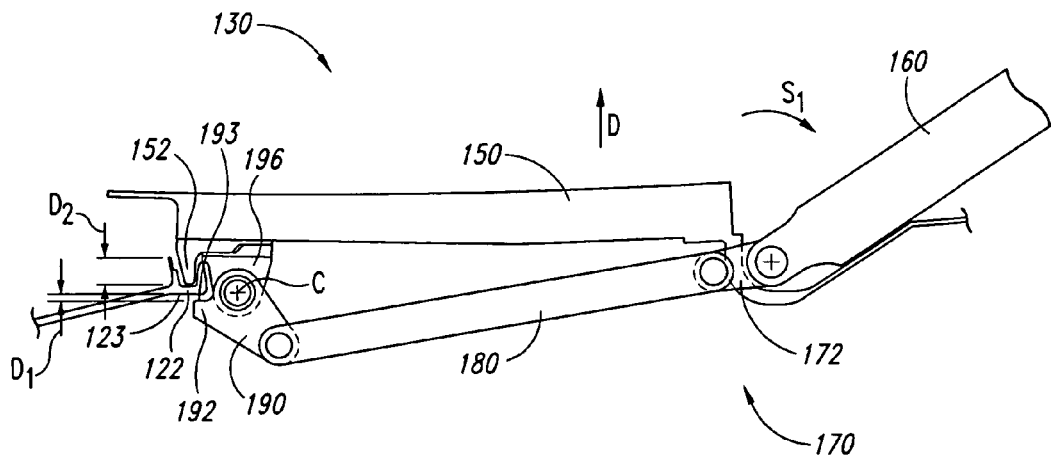
FIG. 8 is a schematic view of the locking assembly when the thrust reverser is completely deployed.

Referring back to FIG. 4, the crank 172 is pivotably coupled to the link 180 so that rotation of the crank 172 in the direction $S_1$ about the axis B drives the link 180 in a direction $T_1$. Because the locking member 190 is pivotably coupled to the link 180 and the support member 196, movement of the link 180 in the direction $T_1$ pivots the locking member 190 in a direction $S_2$ about the axis C. The locking element 190 includes a projection 192 that moves toward the V-groove 122 as the locking element 190 pivots about the axis C. For example, FIG. 7 illustrates the locking assembly 170 when the thrust reverser 130 is partially deployed, and FIG. 8 illustrates the locking assembly 170 when the thrust reverser 130 is completely deployed. When the thrust reverser 130 is completely deployed, a surface 193 on the projection 192 is positioned against or at least proximate to a surface 123 on the back side of the V-groove 122. In either case, a distance $D_1$ between the surface 193 of the projection 192 and the surface 123 of the V-groove 122 is less than a depth $D_2$ of the V-groove 122. This advantageously inhibits the V-groove 122 from disengaging with the V-blade 152 when the thrust reverser 130 is deployed.

In additional embodiments, such as those described below with reference to FIGS. 12-14, the locking assembly 170 can have other configurations. Moreover, although the illustrated locking assembly 170 is actuated by drag link 160, in other embodiments, a locking assembly may not be physically coupled to the drag link 160. Rather, the locking assembly may include a controller and a solenoid or other driving mechanism for moving the locking member 190 between the lock and release positions.

One feature of the thrust reverser 130 illustrated in FIGS. 1-8 is that the locking member 190 is attached to the nozzle inner wall 150 and movable between (a) a release position (shown in FIG. 4) in which the projection 192 is spaced apart from the V-groove 122, and (b) a lock position (shown in FIG. 8) in which the projection 192 is positioned proximate to the V-groove 122. In the lock position, the locking member 190 can prevent or at least inhibit the nozzle inner wall 150 from deflecting radially outwardly in the direction D and inhibit disengagement of the inner V-groove 122 and the inner V-blade 152. If the inner V-blade 152 were to decouple from the inner V-groove 122, the load path from the thrust reverser 130 to the fan casing 120 would be altered and components could be damaged. Accordingly, an aircraft with the illustrated thrust reverser 130 may include a high-thrust engine without causing excessive deflection in the thrust reverser 130 due to the increased loads.

Another feature of the thrust reverser 130 illustrated in FIGS. 1-8 is that the locking assembly 170 automatically moves between the lock and release positions as the thrust reverser 130 moves between the deployed and stowed positions. Accordingly, the locking assembly 170 inhibits disengagement of the inner V-groove 122 and the inner V-blade 152 when increased loads are placed on the nozzle inner wall 150 and does not inhibit disengagement when reduced loads or no load is placed on the nozzle inner wall 150. An advantage of this feature is that internal components of the fan casing 120 and the thrust reverser 130 can be easily accessed during maintenance without having to unlock the locking assembly 170.

Figure 9:
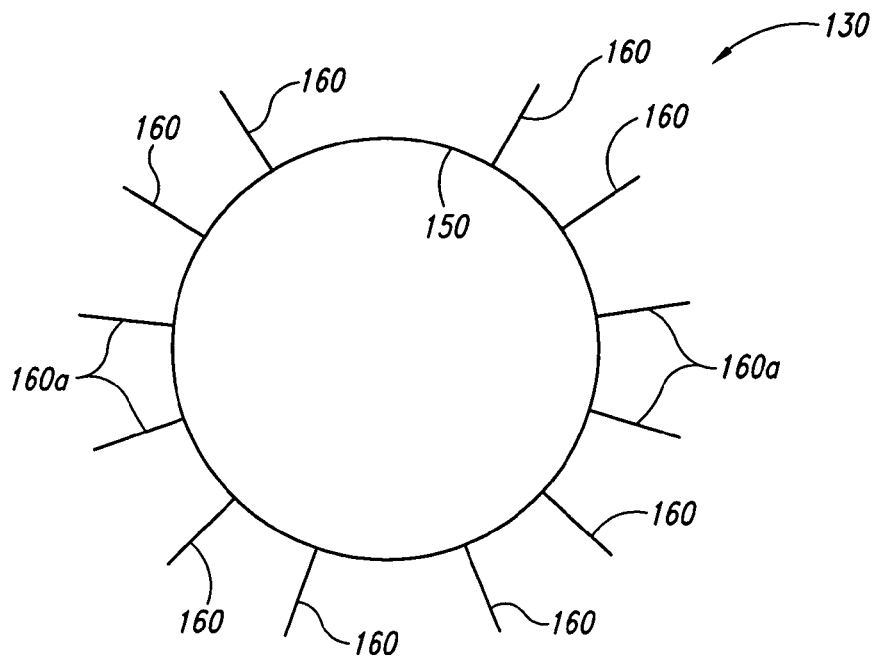
FIG. 9 is a schematic view of a section of the thrust reverser illustrating a plurality of drag links at different locations about the nozzle inner wall.

FIG. 9 is a schematic view of a section of the thrust reverser 130 illustrating a plurality of drag links 160 at different locations about the nozzle inner wall 150. Locking assemblies 170 can be attached to one, several, or all of the drag links 160 to inhibit decoupling of the inner V-blade 122 and the inner V-groove 152 at one or various sections of the nozzle inner wall 150. For example, in one embodiment, four drag links 160a located at a middle section of the nozzle inner wall 150 are coupled to locking assemblies 170. In other embodiments, the drag links 160 at the lower and/or upper portions of the nozzle inner wall 150 can be attached to locking assemblies 170.

B. Additional Embodiments of Locking Assemblies for Use in Thrust Reversers

Figure 10:
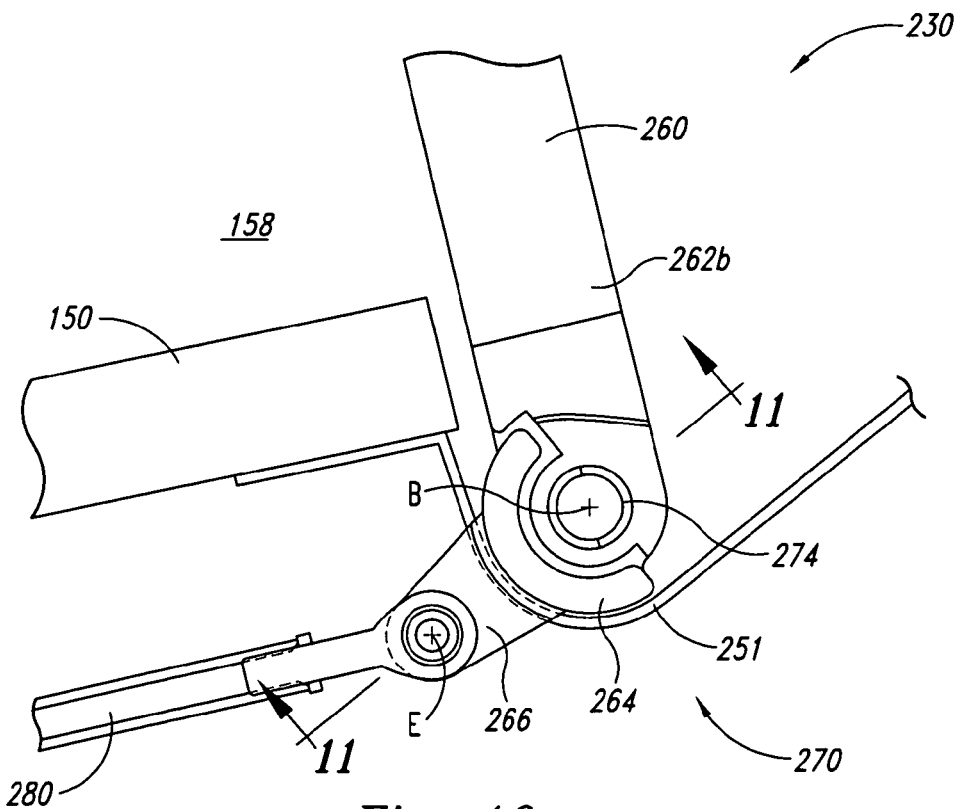
FIG. 10 is a schematic view of a thrust reverser having a locking assembly in accordance with another embodiment of the invention.
Figure 11:
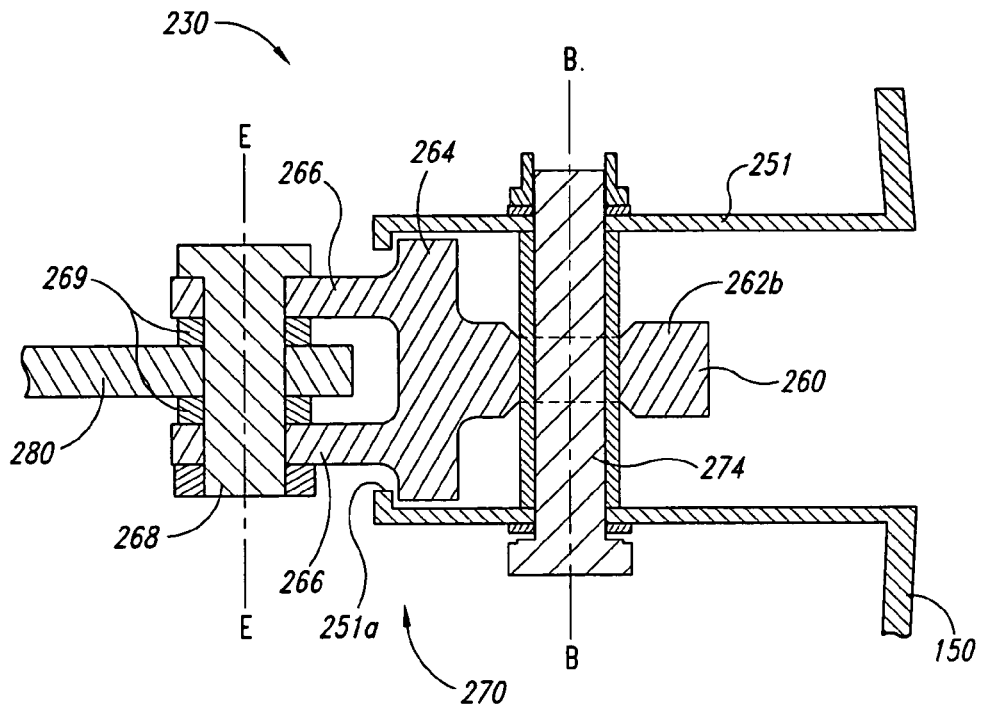
FIG. 11 is a schematic view taken substantially along the line 11-11 of FIG. 10.

FIG. 10 is a schematic view of a thrust reverser 230 having a drag link 260 and a locking assembly 270 in accordance with another embodiment of the invention. FIG. 11 is a schematic view taken substantially along the line 11-11 of FIG. 10. Referring to both FIGS. 10 and 11, the illustrated locking assembly 270 includes a link 280 attached to the drag link 260 without a crank. The drag link 260 has a second end portion 262b partially received in a recess 251 of the nozzle inner wall 150 and pivotably coupled to the inner wall 150 with a fastener 274. As such, the drag link 260 is pivotable about an axis B as the blocker door 142 (FIGS. 2 and 3) moves between the stowed and deployed positions. The illustrated second end portion 262b includes an anti-leak flange 264 and two connector flanges 266 projecting from the anti-leak flange 264. The anti-leak flange 264 can have an arcuate configuration and is positioned proximate to a slot 251a in the recess 251 of the nozzle inner wall 250 to inhibit high pressure gas from exiting the nozzle 158. The connector flanges 266 are pivotally coupled to the link 280 with a fastener 268. The locking assembly 270 may also include a plurality of bearings 269 positioned between the link 280 and the connector flanges 266 so that the drag link 260 and the link 280 can pivot relative to each other about an axis E. In additional embodiments, the joint between the drag link 260 and the link 280 can have other configurations.

Figure 12:
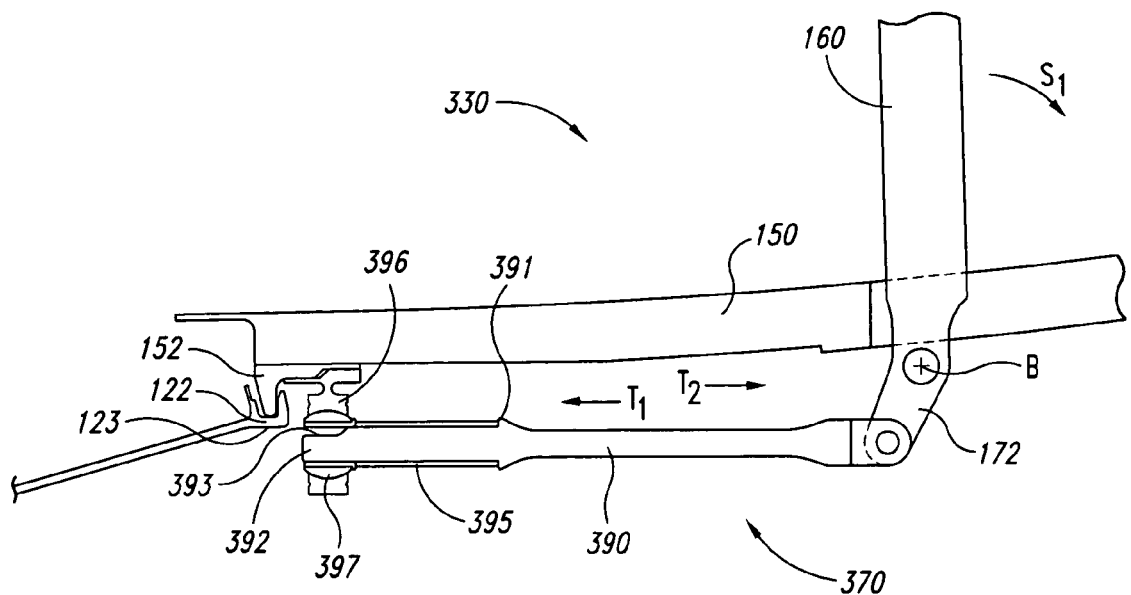
FIG. 12 is a schematic view of a thrust reverser having a locking assembly in accordance with another embodiment of the invention.

FIG. 12 is a schematic view of a thrust reverser 330 having a locking assembly 370 in accordance with another embodiment of the invention. The illustrated locking assembly 370 includes a crank 172, a locking member 390 pivotably coupled to the crank 172, and a support member 396 carrying a portion of the locking member 390. The illustrated locking member 390 includes an end portion 392 with a surface 393 shaped to correspond to a section of the surface 123 on the back side of the inner V-groove 122. The support member 396 is attached to the nozzle inner wall 150 and may include a bearing 397 to facilitate movement of the locking member 390. The locking assembly 370 may further include a spring 395 positioned between a flange 391 of the locking member 390 and the bearing 397 of the support member 396 to urge the locking member 390 in the direction $T_2$.

The locking assembly 370 is moveable between (a) a release position (shown in FIG. 12) in which the end portion 392 is spaced apart from the inner V-groove 122, and (b) a lock position (described further with reference to FIG. 14) in which the surface 393 of the end portion 392 is positioned against and/or proximate to the surface 123 of the V-groove 122. When the drag link 160 pivots about the axis B in the direction $S_1$, the crank 172 pivots and drives the locking member 390 in the direction $T_1$ such that the end portion 392 moves toward the inner V-groove 122. For example, FIG. 13 illustrates the locking assembly 370 with the thrust reverser 330 partially deployed, and FIG. 14 illustrates the locking assembly 370 with the thrust reverser completely deployed. When the thrust reverser 330 is deployed, the end portion 392 is positioned against or at least proximate to the inner V-groove 122 such that a distance $D_3$ between the surface 123 of the inner V-groove 122 and the surface 393 of the end portion 392 is less than the depth $D_2$ of the V-groove 122. This can inhibit the nozzle inner wall 150 from deflecting radially outwardly and the inner V-blade 152 and the inner V-groove 122 from disengaging when the thrust reverser 330 is deployed.

From the foregoing, it will be appreciated that specific embodiments of the invention have been described herein for purposes of illustration, but that various modifications may be made without deviating from the invention. For example, although the illustrated thrust reverser includes a V-blade and the illustrated fan casing includes a V-groove, in other embodiments, the thrust reverser can include a V-groove or other structure and the fan casing can include a V-blade or other structure to couple the thrust reverser and fan casing together. Moreover, aspects of the invention described in the context of particular embodiments may be combined or eliminated in other embodiments. For example, the locking assembly illustrated in FIGS. 4-8 may not include a separate crank similar to the locking assembly illustrated in FIGS. 10 and 11. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. An aircraft system, comprising: a fan casing including a first member; and a thrust reverser including a gas flow path between a nozzle outer wall and a nozzle inner wall, wherein the thrust reverser also includes a second member coupled to the nozzle inner wall for engaging with the first member, and a locking member positioned proximate to the first member, the locking member being movable between (a) a first position in which the first member is positioned between the locking member and the second member such that the locking member inhibits disengagement of the first and second members to at least partially inhibit radially outward deflection of the nozzle inner wall, and (b) a second position in which the locking member does not inhibit disengagement of the first and second members.

2. The aircraft system of claim 1 wherein the first member includes an inner V-groove and the second member includes an inner V-blade, and wherein the thrust reverser further comprises:
   a blocker door movable between a deployed position and a stowed position;
   a drag link operably coupling the locking member and the blocker door such that the locking member moves to the first position when the blocker door moves to the deployed position and the locking member moves to the second position when the blocker door moves to the stowed position;
   an urging member positioned to urge the locking member toward the second position; and
   a support member attached to the nozzle inner wall and positioned adjacent to the inner V-blade, wherein the locking member is carried by the support member and movable relative to the support member between the first and second positions.

3. The aircraft system of claim 1 wherein the first member includes an inner V-groove and the second member includes an inner V-blade.

4. The aircraft system of claim 1 wherein the thrust reverser further comprises:
   a blocker door movable between a deployed position and a stowed position; and
   a drag link operably coupling the locking member and the blocker door such that the locking member moves to the first position when the blocker door moves to the deployed position and the locking member moves to the second position when the blocker door moves to the stowed position.

5. The aircraft system of claim 1, further comprising a support member attached to the nozzle inner wall adjacent to the second member, wherein the locking member is carried by the support member and movable relative to the support member between the first and second positions.

6. The aircraft system of claim 1 wherein the locking member is a first locking member, and wherein the aircraft system further comprises a plurality of locking members positioned proximate to the first member and spaced apart circumferentially, and wherein the individual locking members in the plurality of locking members are movable between the first and second positions.

7. The aircraft system of claim 1 wherein the thrust reverser further comprises an urging member positioned to urge the locking member toward the second position.

8. The aircraft system of claim 1 wherein the locking member slides between the first position and the second position.

9. The aircraft system of claim 1 wherein the locking member pivots between the first position and the second position.

10. The aircraft system of claim 1 wherein the locking member is configured to contact the first member to inhibit deflection of the nozzle inner wall when the locking member is in the first position.

11. The aircraft system of claim 1, further comprising:
   a wing coupled to the fan casing and the thrust reverser;
   a fuselage attached to the wing; and
   a tail coupled to the fuselage.

12. An aircraft system, comprising: a fan casing including a first member; and a thrust reverser including a gas flow path between a nozzle outer wall and a nozzle inner wall, wherein the thrust reverser also includes a second member coupled to the nozzle inner wall for coupling with the first member, a blocker door movable between a deployed position and a stowed position, and means for automatically allowing the first and second members to decouple when the blocker door is in the stowed position and inhibiting the first and second members from decoupling when the blocker door is in the deployed position to at least partially inhibit deflection of the nozzle inner wall toward the gas flow path.

13. The aircraft system of claim 12 wherein the first member includes an inner V-groove and the second member includes an inner V-blade.

14. The aircraft system of claim 12 wherein the means for automatically inhibiting comprise a locking member movable between (a) a first position in which the first member is positioned between the locking member and the second member such that the locking member inhibits the first and second members from decoupling, and (b) a second position in which the locking member does not inhibit the first and second members from decoupling.

15. The aircraft system of claim 12 wherein the means for automatically inhibiting comprise:
   a locking member movable between (a) a first position in which the first member is positioned between the locking member and the second member such that the locking member inhibits the first and second members from decoupling, and (b) a second position in which the locking member does not inhibit the first and second members from decoupling; and a drag link operably coupling the locking member and the blocker door such that the locking member moves to the first position when the blocker door moves to the deployed position and the locking member moves to the second position when the blocker door moves to the stowed position.

16. The aircraft system of claim 12 wherein the means for automatically inhibiting comprise a locking member positioned such that the first member is between the locking member and the second member when the locking member inhibits the first and second members from decoupling and the blocker door is in the deployed position.

17. The aircraft system of claim 12 wherein the means for automatically inhibiting comprise:

a locking member positioned proximate to the first member and movable between (a) a release position in which the locking member does not inhibit the first and second members from decoupling, and (b) a lock position in which the locking member inhibits the first and second members from decoupling; and a support member attached to the nozzle inner wall adjacent to the second member, wherein the locking member is carried by the support member and movable relative to the support member between the lock and release positions.

18. The aircraft system of claim 12 wherein the means for automatically inhibiting comprise:

a locking member movable between (a) a first position in which the first member is positioned between the locking member and the second member such that the locking member inhibits the first and second members from decoupling, and (b) a second position in which the locking member does not inhibit the first and second members from decoupling; and an urging member positioned to urge the locking member toward the second position.

* * * * *